(12) United States Patent
Jamarowicz

(10) Patent No.: US 12,433,279 B2
(45) Date of Patent: Oct. 7, 2025

(54) FISHING LURE PACKING DEVICE

(71) Applicant: Ronald Jamarowicz, Newark, DE (US)

(72) Inventor: Ronald Jamarowicz, Newark, DE (US)

(*) Notice: Subject to any disclaimer, the term of this patent is extended or adjusted under 35 U.S.C. 154(b) by 0 days.

(21) Appl. No.: 18/199,302

(22) Filed: May 18, 2023

(65) Prior Publication Data
US 2024/0381861 A1   Nov. 21, 2024

(51) Int. Cl.
*A01K 97/06* (2006.01)

(52) U.S. Cl.
CPC ................... *A01K 97/06* (2013.01)

(58) Field of Classification Search
CPC ..................................................... A01K 97/06
USPC ......... 43/57.2, 57.1, 54.1; 206/315; 224/920
See application file for complete search history.

(56) References Cited

U.S. PATENT DOCUMENTS

| | | | | |
|---|---|---|---|---|
| 595,998 | A * | 12/1897 | Garland | A01K 97/06 43/57.2 |
| 1,490,370 | A * | 4/1924 | Figley | A01K 97/06 43/57.2 |
| 1,755,903 | A * | 4/1930 | Townsend | A01K 97/06 43/57.1 |
| 3,564,755 | A * | 2/1971 | Lindgren, Sr. | A01K 97/06 43/57.2 |
| 4,203,245 | A | 5/1980 | Peterson | |
| 4,258,843 | A * | 3/1981 | Wymer | A61B 17/12009 242/586.6 |
| 4,287,987 | A * | 9/1981 | Hoffman | A61B 17/06133 206/382 |
| 4,467,551 | A | 8/1984 | Pulver | |
| 4,493,654 | A * | 1/1985 | Stuart | G09B 3/12 434/347 |
| 4,589,546 | A | 5/1986 | Sunderland | |
| 4,631,856 | A | 12/1986 | Born | |
| 4,680,886 | A * | 7/1987 | Caselli, Sr. | A01K 97/06 43/57.1 |
| 4,924,621 | A * | 5/1990 | Hawranik | A01K 97/06 43/57.2 |
| D347,989 | S * | 6/1994 | DeWard | D8/358 |
| 5,475,942 | A * | 12/1995 | Tatum | A01K 97/06 43/25.2 |
| 5,815,979 | A * | 10/1998 | George | A01K 97/06 43/57.2 |
| 5,941,017 | A * | 8/1999 | Junck | A01K 97/06 43/57.2 |
| 7,284,349 | B1 * | 10/2007 | Sala | A01K 97/06 43/57.2 |
| 7,318,296 | B2 * | 1/2008 | Thal | A01K 97/06 43/57.2 |
| 7,937,884 | B1 | 5/2011 | Naylor et al. | |
| D696,348 | S * | 12/2013 | Dilker | D19/113 |
| 9,247,723 | B1 * | 2/2016 | Fisser | A01K 97/06 |
| 10,595,521 | B2 | 3/2020 | Stanley | |
| 2009/0119974 | A1 * | 5/2009 | Rieux | A01K 97/06 43/57.2 |
| 2017/0325441 | A1 * | 11/2017 | Martin | B65D 25/10 |
| 2021/0185995 | A1 | 6/2021 | Morash | |

* cited by examiner

Primary Examiner — William L Gmoser

(57) ABSTRACT

A device for packing a fishing lure of any size, shape, or type that has an attached leader line to the lure. The lure is then secured onto the device. The device comprises of a plurality of indentations on all sides of the device, where the plurality of indentations includes a first sets of indentations and a second sets of indentations. The first sets of indentations and second sets of indentations are on adjacent sides.

17 Claims, 7 Drawing Sheets

FISHING LURE PACKING DEVICE

FIELD OF THE INVENTION

The present invention relates generally to packing fishing lures. More particularly, the present invention relates to packing fishing lures, such lures typically include all shapes and sizes. The device is designed to pack, store, and conveniently access a variety of different fishing lures that can be stored in any storage container.

BACKGROUND OF THE INVENTION

The following background information may present examples of specific portions of the prior art (e.g., without limitation, methods, facts, or common knowledge) that, while expected to be helpful to further educate the reader as to additional aspects of the prior art, is not to be construed as limiting the present invention, or any embodiments thereof, to anything stated or implied therein or inferred thereupon.

Baits and lures of one type or another have been used by fisherman for many years. Natural materials such as worms, minnows, and the like were utilized as baits. While such baits are even now considered to be acceptable by many fishermen, through the years, fishermen have transitioned to use artificial lures for many different reasons. These lures come in all shapes and forms.

Fishermen use multiple lures of different types (i.e., sizes and shapes) and need a convenient method of organizing and packaging the lures. A lure is a small artificial object often having a unique shape or shaped like a fish's prey that are attached to a hook and tied to the end of a fishing line or have leader lines attached to them that later connect to a fishing line. A "leader line" means a piece of fishing line that is a separate line which is tied to a lure, and then gets tied to the actual line of the fishing reel spool.

Many fishermen have to buy certain storage boxes referred to as "tackle boxes." These containers usually contain an interior chamber for storing fishing tackle, such as fishing lures and the like, therein. Many existing lure storage devices generally are oriented towards a single type of lure which forces the fishermen to use different storage devices which impairs his space constraints.

Fishermen further use fishing rig holders for holding individual rigs with leaders in a protective groove to limit possible injuries. These individual rig holders only happen to work for certain types and sizes of lures. Despite the benefit of these holders, they have several drawbacks. For example, the stored lures tend to move around as the container is moved and this movement causes the lures to become tangled with other lures and items in the container.

The present invention overcomes these issues with a conventional fishing lure packing device. The present invention allows packing of any size, shape, type, or kind of lure, plastic or rubber, to be safely packaged and stored in any container. Furthermore, the present invention neither requires a compartment nor a particular tackle box to store such lures.

SUMMARY OF THE INVENTION

A primary feature of the invention is to provide a fishing lure packing device having means for individually holding any shape, type, or size of lure to permit easy handling and storage in any kind of container. A device for packing a fishing lure: a plurality of indentations on all sides of the device, wherein the plurality of indentations comprises: a first sets of indentations; and a second sets of indentations, wherein the first sets of indentations and second sets of indentations are adjacent sides.

Another object of the present invention is to provide a device with a fabrication from one or more of a wide variety of different materials and components that provide a convenient method of packing a lure in all shapes, sizes, and orientations. The device is employed with a material such as plastic, polymer, or a polyurethane material which covers the corresponding sides of the device. This material supports the lure and the lead line and safeguards the lead line from any tear or damage.

BRIEF DESCRIPTION OF THE DRAWINGS

The present invention is illustrated by way of example, and not by way of limitation, in the figures of the accompanying drawings, in which like reference numerals refer to similar elements, and in which.

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods disclosed herein. The description of a device or a structure referenced by a numeral in a drawing is applicable to the description of that device or structure shown by that same numeral in any subsequent drawing herein.

DETAILED DESCRIPTION OF THE INVENTION

Figure 1A:
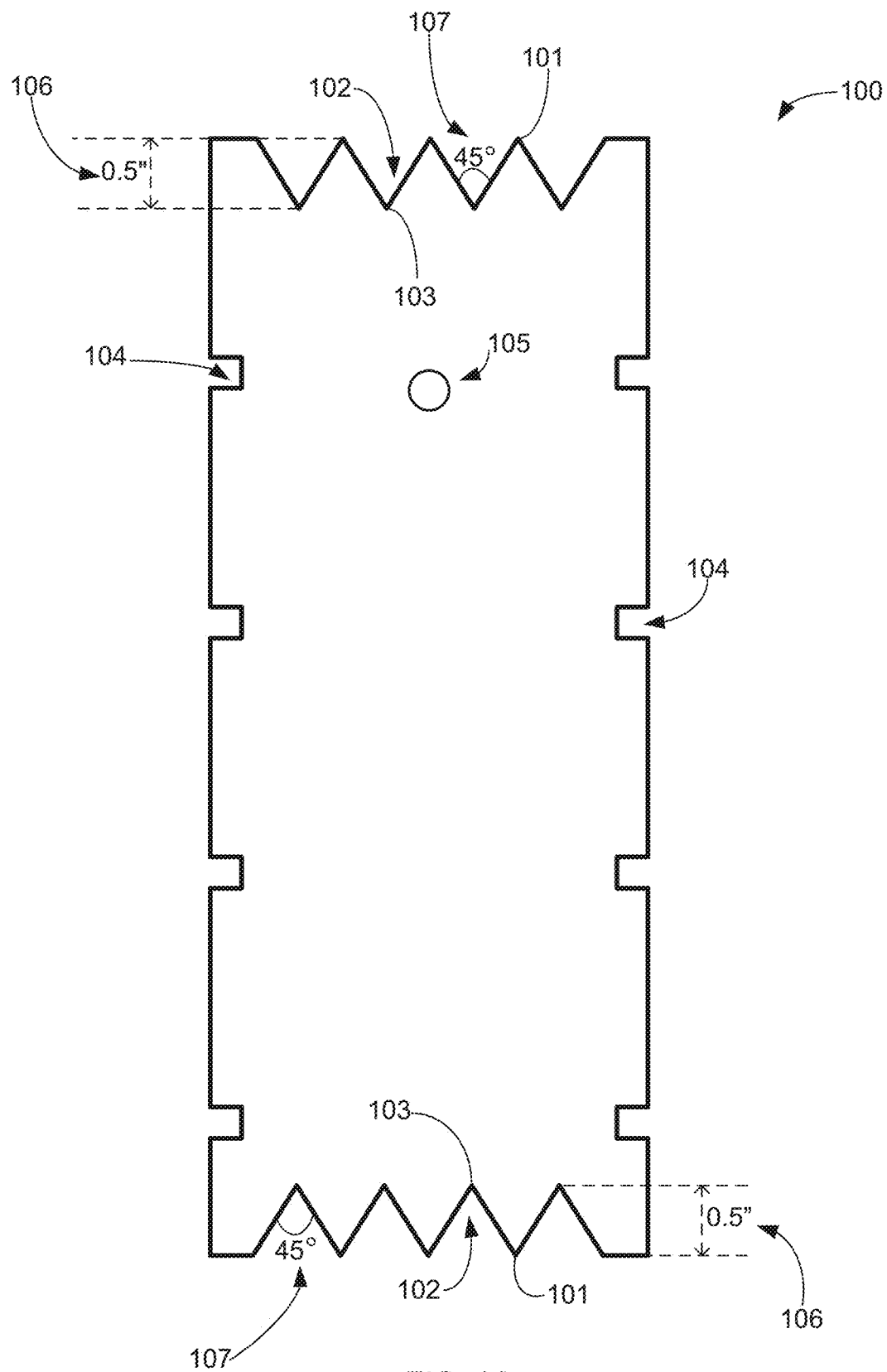
FIG. 1A exemplarily illustrates a device for the packing of any kind and type of lure.

In the following detailed description of the invention, numerous details, examples, and embodiments of the invention are described. However, it will be clear and apparent to one skilled in the art that the invention is not limited to the embodiments set forth and that the invention can be adapted for any of several applications. Moreover, any embodiments disclosed herein are not to be interpreted as the only possible embodiments.

Furthermore, those skilled in the art will readily appreciate that the detailed description given herein with respect to these examples is for explanatory purposes, as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing the particular embodiments only and is not intended to limit the scope of the present invention. It must be noted that as used herein and in the appended claims, the singular forms "a," "an," and "the" include the plural reference unless the context clearly dictates otherwise.

Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention.

As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims.

Furthermore, there is no intention to be bound by any expressed or implied theory presented in the preceding technical field, background, brief summary, or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting unless the claims expressly state otherwise.

Figure 1B:
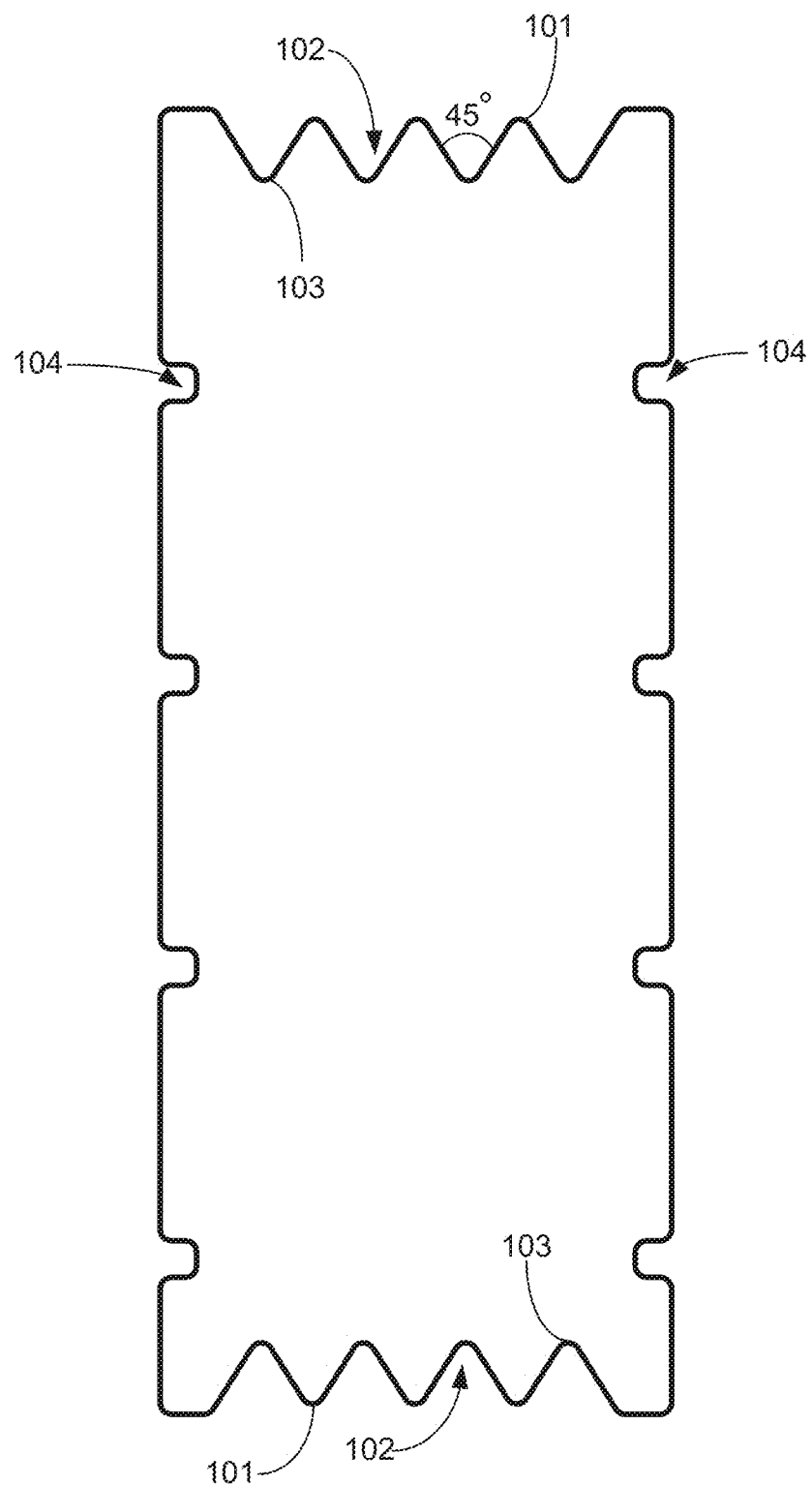
FIG. 1B exemplarily illustrates a device with round curves.
Figure 1C:
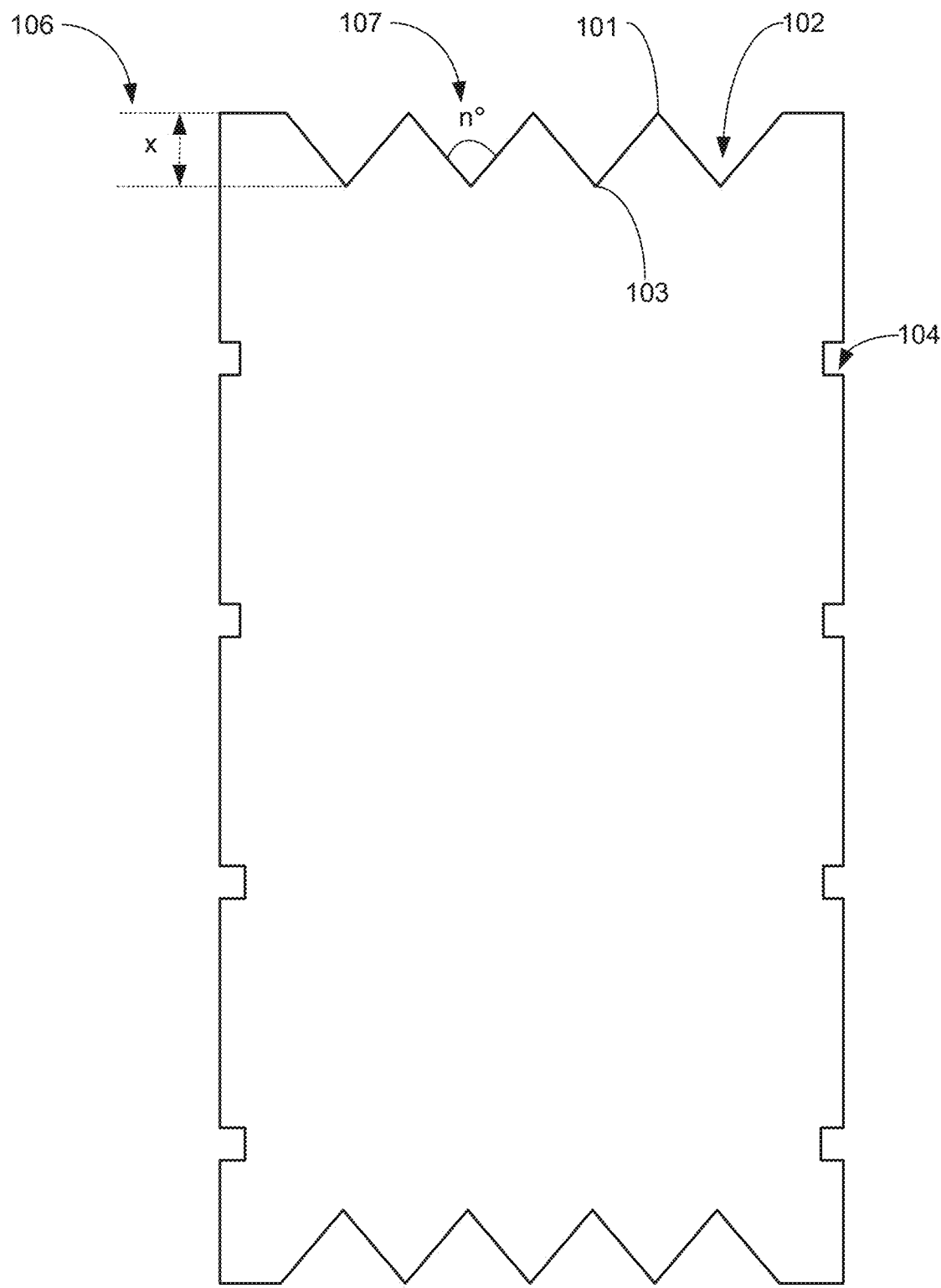
FIG. 1C exemplarily illustrates a device with different degree angles of indentations.
Figure 2:
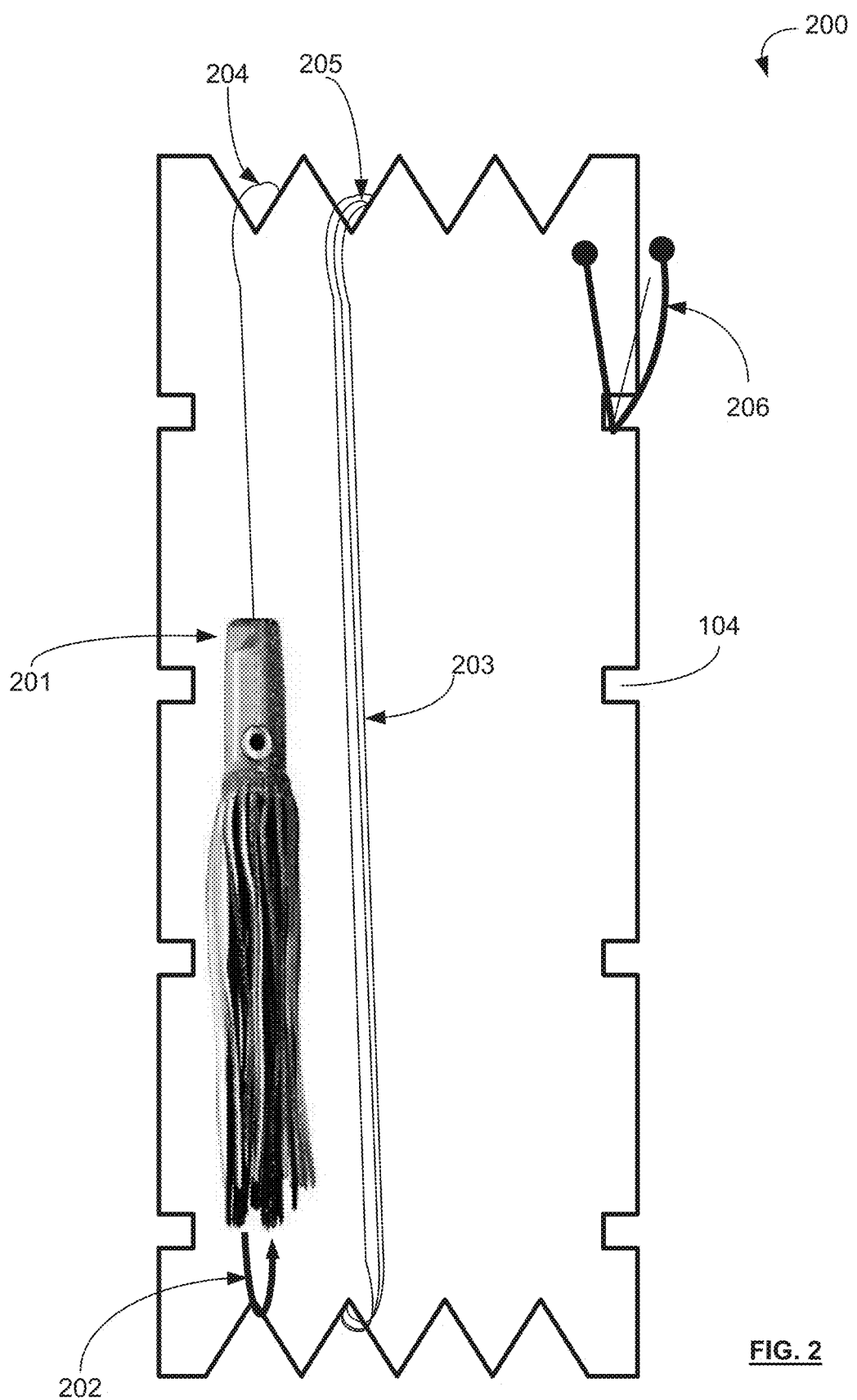
FIG. 2 exemplarily illustrates a lure secured to the device.
Figure 3:
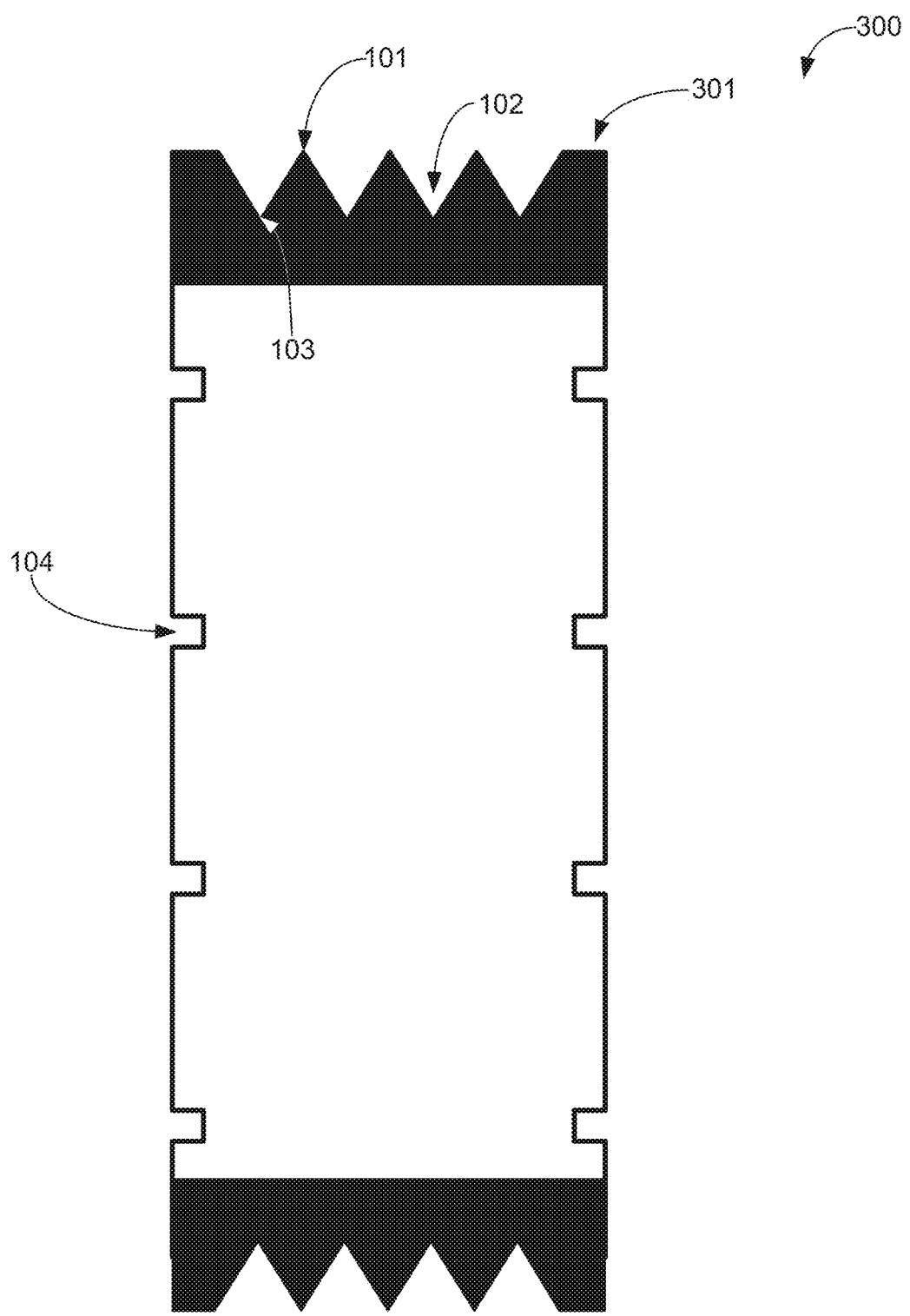
FIG. 3 exemplarily illustrates the device with a fabricated material on the top and bottom of the device.

A lure packaging device 100 is referenced in FIGS. 1-3. Fishing device 100, in FIG. 1A is a unique device for packing and storing all types and sizes of fishing lures.

The device 100 includes a top peak 101, a bottom peak 103, indentations 102, side indentations 104, centre opening 105, and depth of the indentations 106.

The device 100 can be of any shape, form, and size that will accommodate what type and size of lure will be secured to the device. This means the device 100 can be a multiform device. In one embodiment the device 100 is a rectangular shape that has indentations 102 and side indentations 104.

The indentations 102 are formed between the top peaks 101 of the device. The device has multiple indentations 102 to help secure any and all types of lures with a leader line attached to the lure. The leader line can be a different weight, length, or size from the line on the fishing reel spool. However, it can also be of the same weight as the fishing reel spool line.

In one embodiment the indentations 102 between the top peaks 101 form a forty-five (45°) degree angle 107, as shown in FIG. 1A. The 45° angle 107 creates an opening that allows the leader line 203 to securely wrap onto the device and comfortably fit and sit in the indentations 102.

In another embodiment these indentations can be different angles that form an angle of up to ninety (90°). The angles of the indentations 102 may vary based on the size, shape and length of the lures and the leader lines. For example, when you have a large sized lure that requires a heavy leader line, this may require the angle of the indentations 102 to be greater than 45° to allow a wider opening for the leader line to comfortably fit and sit in the indentations 102. The different angles of the indentations 102 are further shown in FIG. 1C.

The length of the indentations 102 may vary depending on the size of lure and length of the leader line being secured on the device. In FIG. 1A, the depth 106 of the indentations 102 is a half (0.5") an inch which provides a reasonable depth to fit a variety of different sized lures and tie different lengths of leader lines. Yet in another embodiment, the indentations 102 can be of any depth where the depth of the indentations 102 are dimensionally and proportionally to the length of the device to allow the lure and leader line enough space to fit securely and comfortably. For example, the device 100 has a length of eight inches (8") and the depth 106 of the indentations 102 is half (0.5") an inch.

Furthermore, in FIG. 1A the top peaks 101 and bottom peaks 103 have sharp pointing tips. These peaks can be of different shapes and forms. For example, in one embodiment, the top peaks 101 and bottom peaks 103 can have a round shape as shown in FIG. 1B. The top peaks 101 and bottom peaks 103 in FIG. 1B form a rounded shape rather than the sharp pointing tips shown in FIG. 1A. For example, the rounded shapes on the peaks of the device, shown in FIG. 1B, safeguard the leader line from any tear or damage. Moreover, the rounded shapes provide a safer means for storing the device.

The manner in which a lure is placed on the device 200 is illustrated in FIG. 2. With the lure 201 being pre-tied to a leader 203 of a desired length and weight (of the line), the end of the hook 202 is secured onto one of the indentations 102 with the first portion of the leader line 203 wrapped to the corresponding opposite indentation 204 with the leader line 203 wrapped onto an adjacent indentation 205.

The leader line 203 is then secured by one of the side indentations 104 as shown in both FIG. 1A and FIG. 2. The leader line 203 sits in one of the side indentations 104 which is then secured and used to prevent the leader line 203 from unwinding after it has been tied to the device. The side indentations 104 provide the means to mount the leader 203 onto the device and add proper means to secure the leader line 203 to the device. The leader line 203 is further secured in place by a separate fastener 206.

The fastening device 206 includes a variety of different fasteners. These fasteners with adhesive or other materials can be used to secure the end of the leader line 203 to the device.

FIG. 3 illustrates the device 300 having a material 301 that is fabricated and employed with one or more of a wide variety of different materials. The fabricated material 301 can be made from a hard but soft material that provides support to the device and protects the leader line 203 from being damaged. Further, the material 301 is used to provide a tightened hold of the leader line 203, adds durability to prevent any cracks or damage to the device, safeguards the leader line 203 from cuts and damage, safely holds and secures the hook 202 on the lure 201, and improves the methods of protection and safeguarding of the device, the lure 201 and leader line 203.

Fishing lines become fragile when the line is damaged by a tear or the like, thus any tears and cuts will prevent the fishing line from performing at its maximum strength and capabilities. Preferably, the indentations 102 are formed from a flexible material such as rubber that is rugged enough yet can secure the leader line 203 wrapped around the device without damaging the leader line 203.

In one embodiment, the material 301 can be fabricated from a material that provides enough resistance between the leader line 203 and the indentations 102 that will prevent the leader line 203 from unwinding from its tied position without damaging the leader line 203.

Yet in another embodiment, the fabricated material 301 at the top of the device can be a different material than from the bottom of the device. For example, in FIG. 3B, the bottom portion of the device where the hook 202 is attached can be comprised of a material that is flexible with a viscosity that adapts to withstand the unforced penetration of the hook 202 and securely and safely mounts the hook 202 onto the device to avoid harm from the sharp edges or parts of the hook 202.

Figure 4:
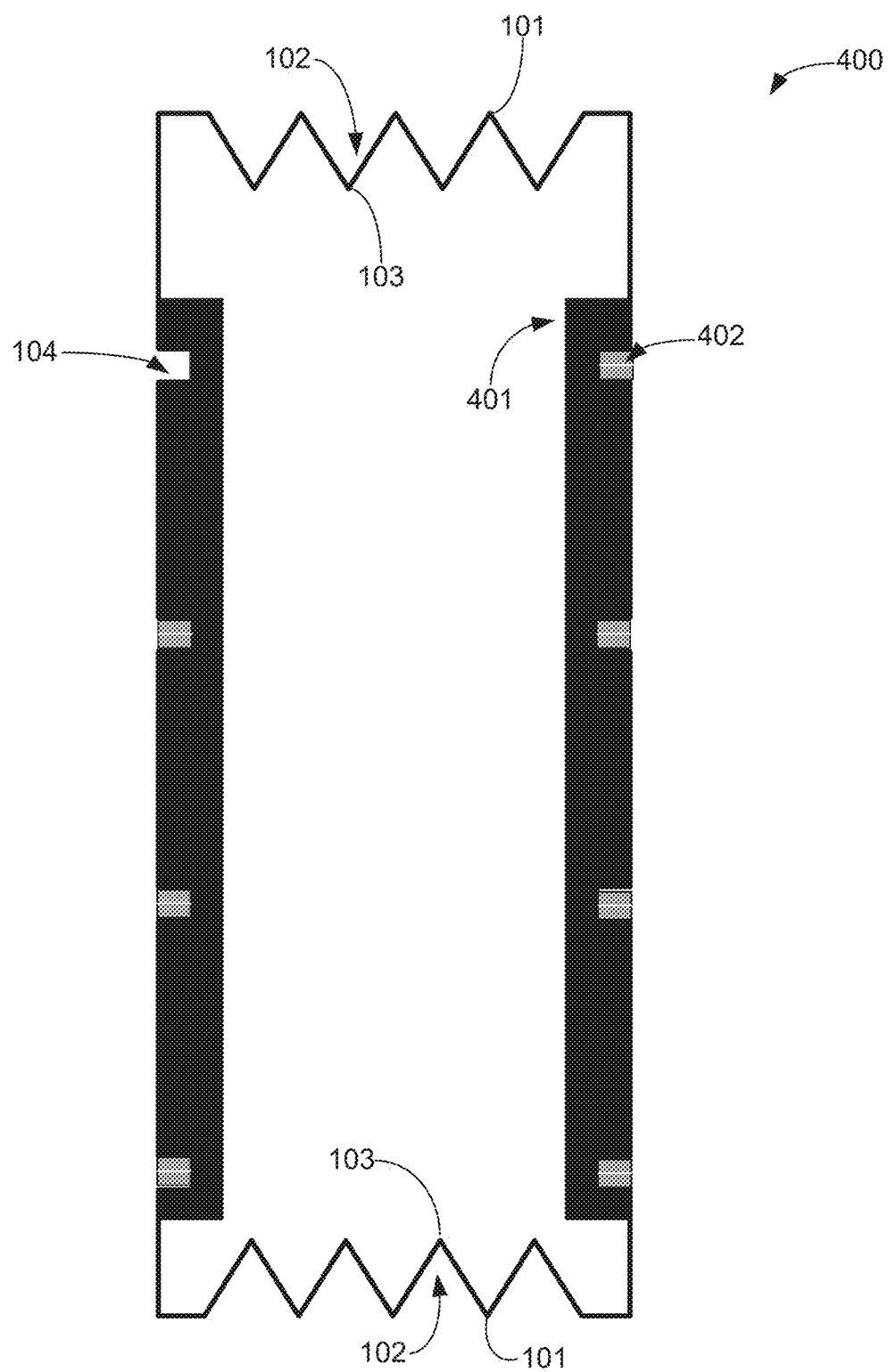
FIG. 4 exemplarily illustrates the device with a fabricated material on the sides of the device.

FIG. 4 illustrates the side indentations 104 with a fabricated material 401 that provides additional methods of securing the leader line 203 to the device. As shown in FIG. 4, the device 400 has a fabricated material 401 on the side indentations 104 with a small crevice 402 where the leader line 203 can be secured after tying down the lure to the device. The material 401 can include a wide variety of different materials, adhesives or the like to secure the leader line 203.

Figure 5:
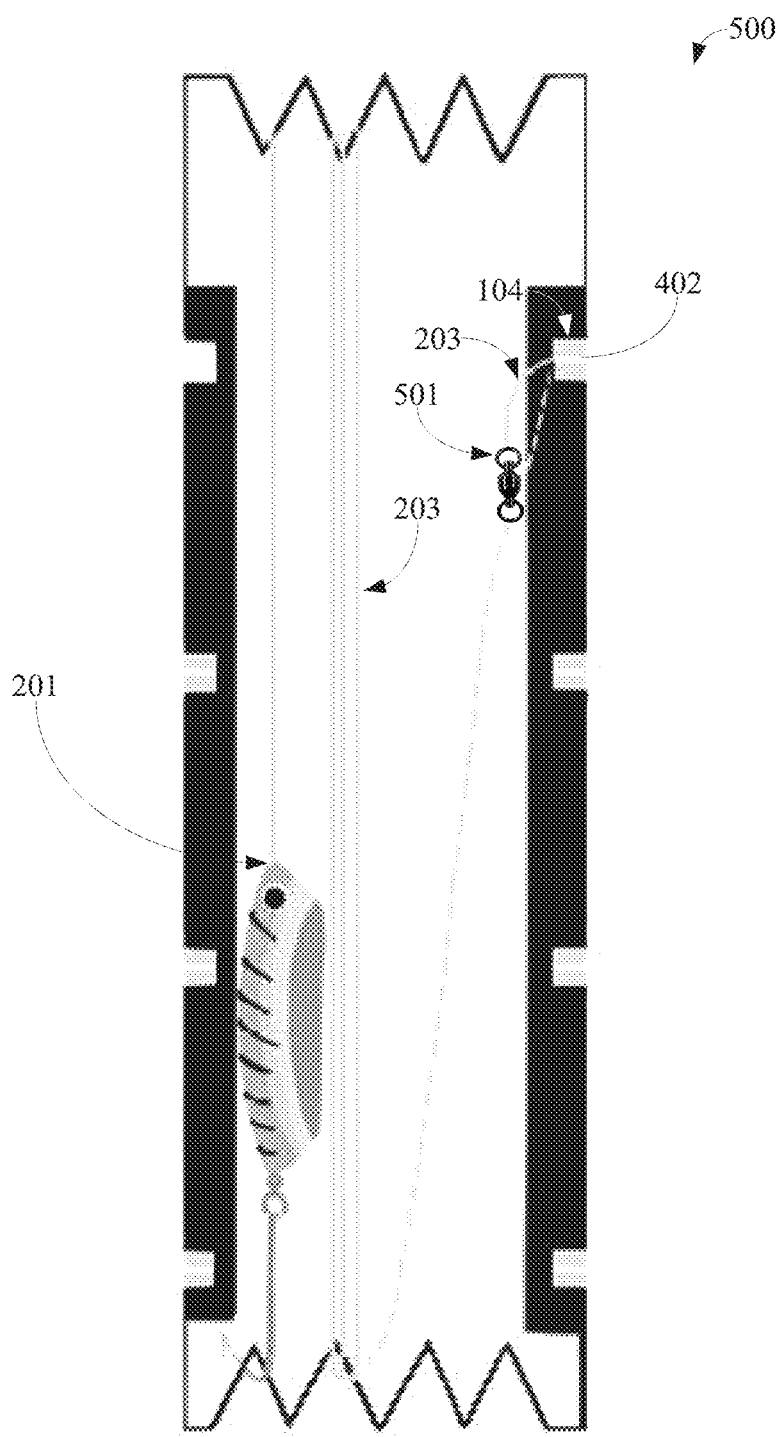
FIG. 5 exemplarily illustrates the leader line of the lure secured to the fabricated material on the side.

FIG. 5 illustrates the lure 201 with the leader line 203 being secured to the fabricated material 401 on the side indentations 104 by inserting the end of the leader line 203 into the small crevice 402. In one embodiment, in device 500, the leader line 203 is secured to the fabricated material 401 on the side indentations 104 where the leader line 203 has a fastened device 501. The fastened device 501 includes different types of fishing swivels such as a barrel swivel, ball-bearing swivel, snap swivel, three-way swivel, or a finesse swivel.

It will be apparent that various modifications can be made in the particular device as described in detail above and shown in the drawings within the scope of the invention. The size, configuration and arrangement of the indentations and device can be changed to meet specific requirements and preferences. Also, the materials employed in its fabrication of the indentations can be of a wider variety of different materials. These and other changes can be made to the device of the invention provided the functioning and operation of the device are not deleteriously affected.

I claim:

1. A device for packing a fishing lure, the device comprising:
   a first material;
   a plurality of indentations on all sides of the device, wherein the plurality of indentations comprises:
   a first set of indentations; and
   a second set of indentations, wherein the first set of indentations and second set of indentations are adjacent sides;
   wherein the plurality of indentations are comprised of a second material;
   wherein the second material is a fabricated material different from and used in combination with the first material; and
   wherein the first set of indentations and second set of indentations are comprised of different fabricated materials used in combination with the first material.

2. The device of claim 1, wherein the device is comprised of one of a quadrilateral shape, of a quadrilateral shape, triangular shape, and polygon shape.

3. The device of claim 1, wherein the first set of indentations and the second set of indentations are comprised of different shapes.

4. The device of claim 1, wherein the fabricated material of the second material is comprised one of a polymer, a rubber, a plastic, a gelatin, a latex, and a polyurethane material.

5. The device of claim 1, wherein one of the first set of indentations and ethe second set of indentations is a set of square indentation and the other of the first set of indentations and second set of indentations is a set of triangular indentations.

6. The device of claim 1, wherein the plurality of indentations are arranged such that each adjacent shape is separated by an angle.

7. The device of claim 1, wherein the first set of indentations comprised of a plurality of triangular shapes is separated by a forty-five (45°) degree angle.

8. The device of claim 1, wherein the first set of indentations are separated by a first angle and the second set of indentations are separated by a second angle.

9. The device of claim 1, wherein at least one indentation from the plurality of indentations, covered by the fabricated material, forms a crevice to receive and secure a line connected to the fishing lure.

10. An apparatus for packing a fishing lure, the apparatus comprising:
    a body formed from a first material;
    a plurality of indentations on all sides of the body, the plurality of indentations comprising:
    a first set of indentations positioned on a first side of the body; and
    a second set of indentations positioned on a second side of the body adjacent to the first side;
    wherein the first side and second side of the body comprise from a second material,
    wherein the second material is different from the first material;
    wherein the second material is a fabricated material from and used in combination with the first material; and
    wherein the first side and second side are comprised of different fabricated materials.

11. The apparatus of claim 10, wherein the apparatus is comprised one of a quadrilateral shape, triangular shape, and polygon shape.

12. The apparatus of claim 10, wherein the combination of the first material and the second material provides structural durability, a protective layer, and adaptability for securely holding the fishing lure.

13. The apparatus of claim 10, wherein the second material is configured to provide one of flexibility, cushioning, and absorption, securely holding and protecting the fishing lure.

14. The apparatus of claim 10, wherein the plurality of indentations on the side of the body is one of a triangular shape and a quadrilateral shape.

15. The apparatus of claim 14, wherein the plurality of indentations are arranged such that each adjacent shape is separated by an angle.

16. The apparatus of claim 15, wherein the first set of indentations on the first side of body are separated by a first angle and the second set of indentations on the second side of the body are separated by a second angle.

17. The apparatus of claim 10, wherein the plurality of indentations on all sides of the body are covered by the fabricated material, each indentation forms a crevice to receive and secure a line connected to the fishing lure.

\* \* \* \* \*